United States Patent
Parker

(10) Patent No.: US 8,000,099 B2
(45) Date of Patent: Aug. 16, 2011

(54) POWER SUPPLY COOLING SYSTEM

(75) Inventor: Jeffrey C. Parker, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1275 days.

(21) Appl. No.: 11/256,857

(22) Filed: Oct. 24, 2005

(65) Prior Publication Data

US 2007/0091560 A1   Apr. 26, 2007

(51) Int. Cl.
*H05K 7/20* (2006.01)
*F28F 7/00* (2006.01)
*H01L 23/34* (2006.01)
*G06F 13/00* (2006.01)

(52) U.S. Cl. .............. 361/679.48; 361/679.55; 361/695; 361/679.5; 257/721; 174/16.1; 454/184; 710/303

(58) Field of Classification Search .................. 361/686, 361/687, 679.46, 679.48–679.5, 679.41, 361/694–695; 710/303, 304; 454/184; 312/236; 257/721; 174/16.1
See application file for complete search history.

(56) References Cited

U.S. PATENT DOCUMENTS

| | | | | |
|---|---|---|---|---|
| 5,664,118 A * | 9/1997 | Nishigaki et al. | ............. | 710/304 |
| 5,898,568 A | 4/1999 | Cheng | | |
| 6,034,871 A | 3/2000 | Cheng | | |
| 6,094,347 A * | 7/2000 | Bhatia | ........................... | 361/695 |
| 6,104,607 A | 8/2000 | Behl | | |
| 6,109,039 A * | 8/2000 | Hougham et al. | ................ | 62/3.7 |
| 6,239,970 B1 * | 5/2001 | Nakai et al. | .................... | 361/695 |
| 6,239,971 B1 * | 5/2001 | Yu et al. | ........................ | 361/695 |
| 6,266,243 B1 * | 7/2001 | Tomioka | ........................ | 361/695 |
| 6,275,945 B1 | 8/2001 | Tsuji | | |
| 6,353,536 B1 * | 3/2002 | Nakamura et al. | ............. | 361/686 |
| 6,453,378 B1 * | 9/2002 | Olson et al. | .................... | 710/304 |
| 6,459,574 B1 * | 10/2002 | Ghosh | ........................... | 361/687 |
| 6,459,575 B1 | 10/2002 | Esterberg | | |
| 6,515,856 B2 * | 2/2003 | Hidesawa | ...................... | 361/687 |
| 6,522,535 B1 * | 2/2003 | Helot et al. | .................... | 361/687 |
| 6,542,360 B2 * | 4/2003 | Koizumi | ....................... | 361/687 |
| 6,563,703 B2 | 5/2003 | Xie | | |
| 6,691,197 B2 * | 2/2004 | Olson et al. | .................... | 710/304 |
| 6,738,256 B2 * | 5/2004 | Hsieh et al. | ................... | 361/687 |
| 6,742,070 B2 * | 5/2004 | Fuchida | ........................ | 710/303 |
| 6,781,833 B2 * | 8/2004 | Lu | ................................ | 361/695 |
| 6,894,896 B2 * | 5/2005 | Lin | ................................ | 361/695 |
| 7,038,909 B1 * | 5/2006 | Chen | ............................. | 361/687 |
| 7,106,585 B2 * | 9/2006 | Lin | ................................ | 361/686 |
| 7,110,254 B2 * | 9/2006 | Hara et al. | ..................... | 361/687 |
| 2006/0061964 A1 * | 3/2006 | Cheng | ........................... | 361/687 |

FOREIGN PATENT DOCUMENTS

| | | |
|---|---|---|
| EP | 0989480 | 3/2000 |
| JP | 2000003231 | 7/2000 |
| JP | 2000207063 | 7/2000 |
| JP | 2000214952 | 8/2000 |
| JP | 2000293270 | 10/2000 |

OTHER PUBLICATIONS

EP Office Action dated Mar. 23, 2010, pp. 6.
European Patent Office, Decision to refuse a European Patent application, Appln No. 06020168.8, date of mailing May 18, 2011, pp. 10.
European Patent Office, Summons to attend oral proceedings pursuant to Rule 115(1) EPC, Appln No. 06020168.8, date of mailing Mar. 8, 2011, pp. 5.

* cited by examiner

*Primary Examiner* — Zachary M Pape

(57) ABSTRACT

A power supply cooling system comprises a computer device having at least one inlet for receiving an airflow generated by a cooling system removably couplable to the computer device, the computer device configured to receive power from the cooling system.

13 Claims, 2 Drawing Sheets

POWER SUPPLY COOLING SYSTEM

BACKGROUND OF THE INVENTION

Computer devices, such as laptop or notebook computers, comprise a variety of different types of hardware and/or software including, for example, different types and functional levels of processors and graphic circuits. Thus, some computer devices are configured to operate at relatively high performance levels, thereby generating greater amounts of thermal energy and requiring additional power and/or systems to dissipate the thermal energy. To accommodate the increased operational and thermal dissipation needs of the computer device, new chassis designs to accommodate larger cooling systems and/or additional battery power to meet the operational parameters of the computer device increase costs associated with the computer device.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
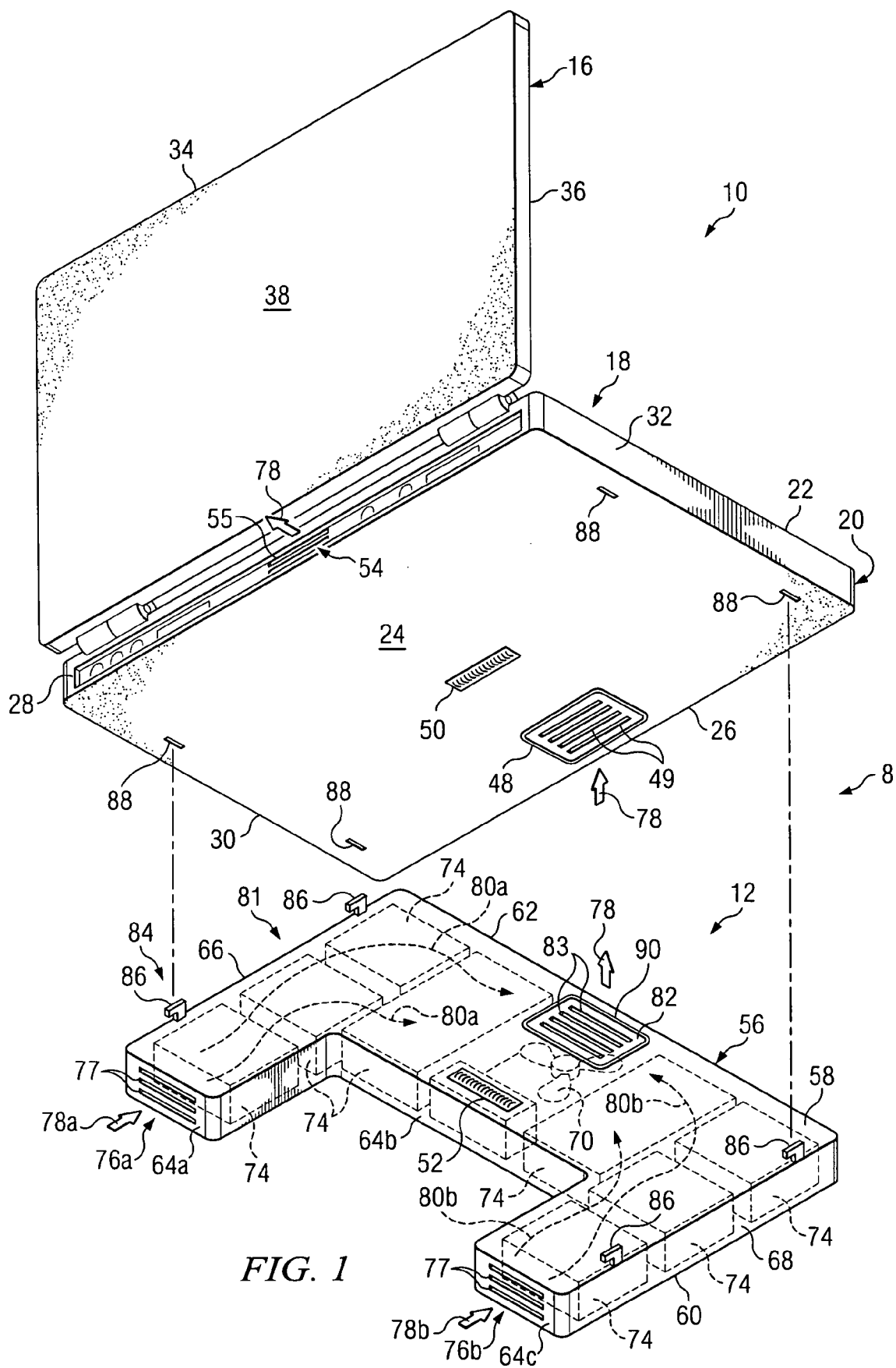
FIG. 1 is a diagram illustrating an embodiment of a power supply cooling system in accordance with the present invention.
Figure 2:
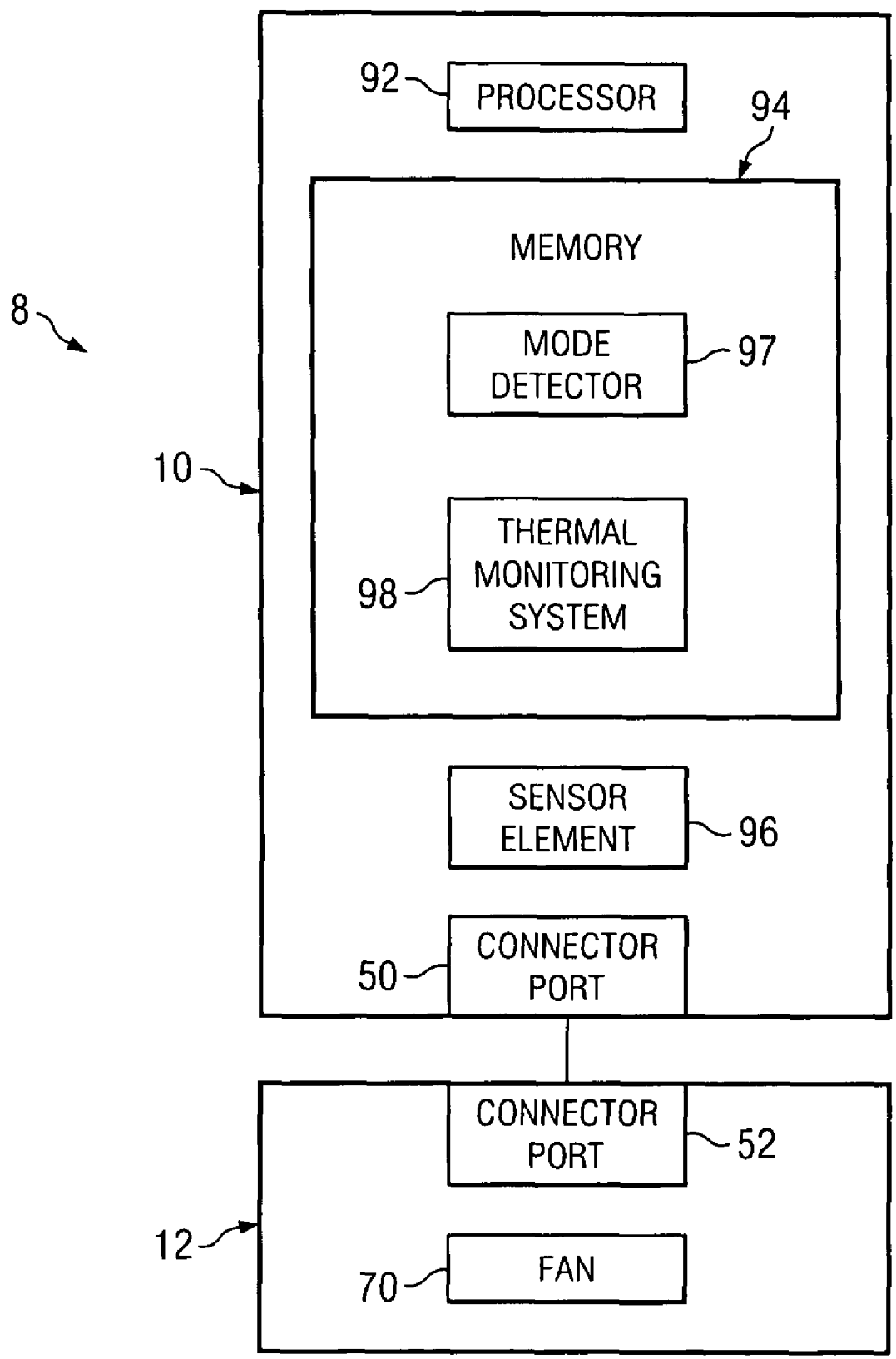
FIG. 2 is a block diagram illustrating an embodiment of the power supply cooling system of FIG. 1.

The preferred embodiments of the present invention and the advantages thereof are best understood by referring to FIGS. 1 and 2 of the drawings, like numerals being used for like and corresponding parts of the various drawings.

FIG. 1 is a diagram illustrating an embodiment of a power supply cooling system 8 in accordance with the present invention. In the embodiment illustrated in FIG. 1, system 8 comprises a computer device 10 and a cooling system 12 removably couplable to computer device 10. In the embodiment illustrated in FIG. 1, computer device 10 comprises a laptop or notebook computer having a display member 16 rotatably coupled to a base member 18. However, it should be understood that computer device 10 may comprise other types of devices such as, but not limited to, tablet personal computers, personal digital assistants, or any other type of portable or non-portable computer device. Cooling system 12 is removably couplable to computer device 10 to provide additional power and/or cooling air to computer device 10.

In the embodiment illustrated in FIG. 1, base member 18 of computer device 10 comprises a housing 20 having a working surface 22, a bottom surface 24, a front surface 26, a rear surface 28 and a pair of side surfaces 30 and 32. Display member 16 comprises a housing 34 having a display surface 36 and a rear surface 38, a top surface 40, a bottom surface 42 and a pair of side surfaces 44 and 46. In the embodiment illustrated in FIG. 1, bottom surface 24 of base member 18 comprises at least one airflow inlet 48 having a plurality of apertures or openings 49 for receiving cooling air from cooling system 12, and a connector port 50 for communicatively engaging a correspondingly positioned connector port 52 on cooling system 12.

In the embodiment illustrated in FIG. 1, housing 20 comprises at least one airflow outlet 54 disposed on rear surface 28 of base member 18 and having plurality of apertures or openings 55. Airflow into inlet 48 and exiting outlet 54 dissipate thermal energy generated by operational components of computer device 10 disposed within housing 20. It should be understood that outlet 54 may be otherwise located on base member 18 (e.g., disposed on surfaces 22, 24, 26, 30 and/or 32) and/or may be disposed on multiple surfaces of base member 18. Further, it should be understood that inlet 48 may be otherwise located on base member 18 corresponding to a source of cooling air provided by system 12.

In the embodiment illustrated in FIG. 1, cooling system 12 comprises a housing 56 having a top surface 58, a bottom surface 60, a front surface 62, rear surfaces 64a, 64b and 64c, and a pair of side surfaces 66 and 68. In the embodiment illustrated in FIG. 1, cooling system 12 comprises a fan 70 for actively generating an airflow and a plurality of battery cells 74 disposed within housing 56. Cooling system 12 is configured to draw an airflow into housing 56 by fan 70 through a pair of inlets 76a and 76b each having apertures or openings 77 and located on respective rear surfaces 64a and 64c. In the embodiment illustrated in FIG. 1, cooling system 12 comprises at least one airflow outlet 82 having a plurality of apertures or openings 83 disposed on top surface 58 of housing 56 for cooperating with inlet 48 of computer device 10. In operation, fan 70 generates a positive airflow 78a and 78b through housing 56 from respective inlets 76a and 76b and following respective airflow paths 80a and 80b toward airflow outlet 82 and exhausts the airflow 78 through outlet 82. As airflow 78a and 78b travels along airflow paths 80a and 80b, thermal energy generated by battery cells 74 and/or any other heat generating device disposed within housing 56 is dissipated through outlet 82. It should be understood that a greater or fewer number of inlets 76 can be disposed on rear surface 64 and/or on any other surface of cooling system 12 (e.g., surface 58, 60, 62, 66 and/or 68).

In the embodiment illustrated in FIG. 1, cooling system 12 is removably couplable to computer device 10 by a locking system 84 such that outlet 82 of cooling system 12 is at least partially aligned with inlet 48 of base member 18, thereby providing an airflow from cooling system 12 to base member 18. In FIG. 1, a single inlet 48 and outlet 82 are illustrated. However, it should be understood that additional correspondingly aligned inlets/outlets on respective computer device 10 and cooling system 12 may be used. In the embodiment illustrated in FIG. 1, locking system 84 comprises a plurality of hooks 86 insertable into a plurality of correspondingly positioned openings 88 disposed on bottom surface 24 of base member 18 to securely fasten cooling system 12 to computer device 10. However, it should be understood that other devices or methods may be used to removably secure cooling system 12 to computer device 10. Further, it should be understood that cooling system 12 may be coupled to base member 18 using other locations and/or surfaces of base member 18 (e.g., surfaces 22, 26, 28, 30 and/or 32).

In the embodiment illustrated in FIG. 1, an engagement member 90 is used to facilitate a connection between outlet 82 of cooling system 12 and inlet 48 of computer device 10 to prevent or substantially prevent airflow leaks therefrom. Engagement member 90 may comprise an elastomeric member, protrusion or other device for facilitating engagement of outlet 82 to inlet 48. In the embodiment illustrated in FIG. 1, engagement member 90 is disposed on top surface 58 of cooling system 12 about a perimeter of outlet 82 such that when cooling system 12 is attached to computer device 10, engagement member 90 directs the airflow from outlet 82 to inlet 48, thereby eliminating or substantially reducing airflow loss between cooling system 12 and computer device 10. It should be understood that, alternatively or additionally, engagement member 90 may be installed on bottom surface 24 of base member 18.

In operation, when cooling system 12 is coupled to computer device 10, airflow 78 is directed into base member 18 through inlet 48 and exits base member 18 through outlet 54 to dissipate thermal energy generated by operational components of computer device disposed within base member 18. Preferably, battery cells 74 of cooling system 12 are used to power cooling system 12 (e.g., providing power to fan 70 and/or other operational components of cooling system 12) and also provide power to computer device 10 (e.g., through connector ports 50 and 52). However, it should be understood that cooling system 12 may be otherwise powered (e.g., by internal and/or external batteries of computer device 10 or alternating current (AC) power obtained from an external outlet or AC adapter).

Preferably, computer device 10 is configured to operate in either a lightweight or low performance mode, where cooling system 12 is detached from computer device 10, or a high performance mode, where cooling system 12 is attached to computer device 10. For example, in the lightweight or low performance mode, computer device 10 operates at a lower performance level, thereby utilizing less battery power and generating lower amounts of thermal energy. Accordingly, the need for additional cooling and/or power supplied via cooling system 12 is reduced. However, when computer device 10 is operated in the high performance mode, computer device 10 operates at a higher performance level, thereby utilizing additional power and generating increased levels of thermal energy. Accordingly, cooling system 12 enables computer device 10 to operate at higher performance levels by dissipating the additional thermal energy generated by computer device in the high performance mode and also providing an additional source of power to computer device 10 (e.g., via battery cells 74). Thus, in some embodiments of the present invention, cooling system 12 is configured as a cooling battery pack by providing both cooling and battery power functionality to computer device 10.

FIG. 2 is a block diagram illustrating system 8 comprising computer device 10 and cooling system 12 of FIG. 1. In the embodiment illustrated in FIG. 2, computer device 10 comprises a processor 92 coupled to a memory 94, a sensor element 96, and connector port 50 for communicatively engaging connector port 52 of cooling system 12. In the embodiment illustrated in FIG. 2, computer device 10 also comprises a mode detector 97 and a thermal monitoring system 98. Mode detector 97 and thermal monitoring system 98 may comprise software, hardware, or a combination of software and hardware. In FIG. 2, mode detector 97 and thermal monitoring system 98 are illustrated as being stored in memory 94 so as to be accessible and/or executable by processor 92. However, it should be understood that mode detector 97 and/or thermal monitoring system 98 may be otherwise located or stored.

In some embodiments of the present invention, mode detector 97 is used to detect whether cooling system 12 is attached to computer device 10. In some embodiments of the present invention, mode detector 97 detects whether cooling system 12 is attached to computer device 10 by determining an engagement status of connector port 50 with connector port 52 of cooling system 12, communication, or lack thereof, of communication and/or data signals between computer device 10 and cooling system 12, detection of a current or power supply at connector port 50, or otherwise. If mode detector 97 determines that cooling system 12 is not attached to computer device 10, computer device 10 is preferably configured to operate in the lightweight mode. If mode detector 97 detects that cooling system 12 is attached to computer device 10, computer device 10 is preferably configured to operate in the high performance mode.

In some embodiments of the present invention, sensor element 96 is used to detect and/or measure a level of thermal energy generated by components of computer device 10 (e.g., a temperature sensor). Thermal monitoring system 98 monitors temperature information received from sensor element 96 and generates a signal that is processed by hardware, software, and/or a combination thereof, of computer device 10 (e.g., a basic input output system (BIOS), operating system or other hardware and/or software component of computer device 10) to control the speed of fan 70 and/or actuation/de-actuation of fan 70. For example, if relatively high amounts of thermal energy are being generated by computer device 10 (e.g., temperature within computer device 10 exceeds predetermined threshold(s)), thermal monitoring system 98 controls and/or otherwise causes actuation of fan 70 and/or an increase in speed of fan 70, thereby increasing a level of thermal energy dissipation from within computer device 10. Accordingly, in response to sensor element 96 detecting and/or measuring a decrease in thermal energy generation (e.g., a decrease in temperature and/or a temperature falling below predetermined threshold(s)), thermal monitoring system 98 controls and/or otherwise causes a decrease in fan 70 speed and/or de-actuation of fan 70. Additionally or alternatively, thermal monitoring system 98 is configured to actuate fan 70 at various intervals, at predetermined fan 70 speeds and/or for predetermined periods of time to dissipate thermal energy generated by operation of computer device 10.

Thus, embodiments of the present invention provide a computer device 10 having a removably couplable cooling device 12 to dissipate heat from computer device 10 and provide power to computer device 10. Embodiments of the present invention enable computer device 10 to be manufactured smaller in size yet with high performance capabilities by providing a battery source with cooling-on-demand capabilities.

What is claimed is:

1. A power supply cooling system, comprising:
a cooling system with a housing that includes a first side portion substantially enclosing a first battery cell and having a first airflow opening, a second side portion substantially enclosing a second battery cell and having a second airflow opening, a fan disposed between the first and second side portions, and a third airflow opening; and
a computer device removably couplable to the cooling system and having at least one inlet for receiving an airflow generated by the fan and through the third airflow opening, the computer device configured to receive power from the cooling system, the computer device configured to determine whether to enable operation thereof in a high performance mode or in a low performance mode based on whether the cooling system is coupled to the computer device.

2. The system of claim 1, wherein the fan provides the airflow through the first and second airflow openings, across the first and second battery cells, and through the third airflow opening to the computer device.

3. The system of claim 1, wherein the at least one inlet is configured to cooperate with the third airflow opening at of the cooling system.

4. The system of claim 1, wherein the computer device comprises a thermal monitoring system configured to actuate the fan of the cooling system.

5. The system of claim 1, wherein the computer device comprises a thermal monitoring system configured to de-actuate the fan of the cooling system.

6. The system of claim 1, wherein the computer device comprises a thermal monitoring system configured to control a speed of the fan of the cooling system.

7. The system of claim 1, wherein the computer device comprises a mode detector configured to determine an engagement status of the cooling system with the computer device.

8. The system of claim 1, wherein the computer device is configured to operate in the high performance mode in response to engagement of the cooling system with the computer device.

9. A cooling battery pack for a computer device, comprising:
a housing couplable to the computer device, the housing comprising a first side portion substantially enclosing a first battery cell and having a first airflow opening, a second side portion substantially enclosing a second battery cell and having a second airflow opening, a fan disposed between the first and second side portions, and a third airflow opening, wherein the fan is configured to provide a cooling airflow through the third airflow opening to the computer device, and the first and second battery cells are configured to power at least one of the computer device and the fan.

10. The cooling battery pack for a computer device of claim 9, wherein the fan provides the cooling airflow through the first and second airflow openings, across the first and second battery cells, and through the third airflow opening to the computer device.

11. The cooling battery pack for a computer device of claim 9, wherein the first and second airflow openings are airflow inlets, and the fan is located below the third airflow opening.

12. The cooling battery pack for a computer device of claim 9, wherein the first and second side portions are disposed on opposite sides of the housing with respect to each other.

13. The cooling battery pack for a computer device of claim 9, wherein the third airflow opening is an airflow outlet and includes an elastomeric member that prevents airflow from leaking from the third airflow opening when the third airflow opening is connected to an airflow opening of the computer device.

* * * * *

UNITED STATES PATENT AND TRADEMARK OFFICE
CERTIFICATE OF CORRECTION

| | | |
|---|---|---|
| PATENT NO. | : 8,000,099 B2 | Page 1 of 1 |
| APPLICATION NO. | : 11/256857 | |
| DATED | : August 16, 2011 | |
| INVENTOR(S) | : Jeffrey C. Parker | |

It is certified that error appears in the above-identified patent and that said Letters Patent is hereby corrected as shown below:

In column 4, line 66, in Claim 3, after "opening" delete "at".

Signed and Sealed this
Tenth Day of April, 2012

David J. Kappos
*Director of the United States Patent and Trademark Office*